US012712297B2

(12) United States Patent
Wu

(10) Patent No.: US 12,712,297 B2
(45) Date of Patent: Aug. 18, 2026

(54) TERMINAL BLOCK HAVING PRESSING FEATURE

(71) Applicants: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

(72) Inventor: Shang-Tsai Wu, New Taipei City (TW)

(73) Assignees: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

(*) Notice: Subject to any disclaimer, the term of this patent is extended or adjusted under 35 U.S.C. 154(b) by 395 days.

(21) Appl. No.: 18/515,935

(22) Filed: Nov. 21, 2023

(65) Prior Publication Data

US 2025/0167468 A1 May 22, 2025

(51) Int. Cl.
*H01R 9/24* (2006.01)

(52) U.S. Cl.
CPC .................................... *H01R 9/24* (2013.01)

(58) Field of Classification Search
CPC ........ H01R 9/24; H01R 4/4821; H01R 4/483; H01R 4/4835; H01R 4/4852; H01R 12/515
See application file for complete search history.

(56) References Cited

U.S. PATENT DOCUMENTS 5,993,245 A * 11/1999 Osada .................. H01R 4/4833 439/441
6,146,217 A * 11/2000 Osada .................. H01R 4/4833 439/441

(Continued)

FOREIGN PATENT DOCUMENTS

DE 4408985 A1 9/1994
DE 102016111536 A1 12/2017

(Continued)

OTHER PUBLICATIONS

Office Action dated Aug. 14, 2024 of the corresponding German patent application No. 102023134249.5.

*Primary Examiner* — Edwin A. Leon
(74) *Attorney, Agent, or Firm* — HDLS IPR SERVICES; Chun-Ming Shih

(57) ABSTRACT

A terminal block includes a housing structure, a handle, a spring piece and an elastic element. The housing structure includes a shell and a terminal fixed in the shell. The handle is movably disposed in the shell. The spring piece is disposed in the shell and has a first fixed segment and a pressed segment. The first fixed segment is fixed in the housing structure. The pressed segment is capable of elastically swinging relative to the first fixed segment along a swing path. The elastic element is disposed in the shell and has a second fixed segment and a pressing segment. The second fixed segment is fixed in the housing structure. The pressing segment is disposed in the swing path and capable of elastically moving relative to the second fixed segment.

9 Claims, 7 Drawing Sheets

(56) References Cited

U.S. PATENT DOCUMENTS

| | | | | |
|---|---|---|---|---|
| 6,420,957 B1 * | 7/2002 | Harada | H01C 1/14 | 338/199 |
| 9,466,894 B2 * | 10/2016 | Wu | H01R 13/42 | |

FOREIGN PATENT DOCUMENTS

| | | | |
|---|---|---|---|
| DE | 102017117459 | A1 | 2/2019 |
| DE | 202023101002 | U1 | 3/2023 |
| EP | 3041089 | A1 | 7/2016 |

* cited by examiner

100

TERMINAL BLOCK HAVING PRESSING FEATURE

BACKGROUND

Technical Field

The disclosure relates to a terminal block, particularly to a terminal block having a pressing feature.

Related Art

Regarding the terminal block, it includes a shell, a handle, a spring piece and terminals, and the handle, the spring piece and the terminals are all arranged in the shell. The shell has a jack, and the spring piece is disposed corresponding to the position of the jack for blocking.

Therefore, the spring piece is elastically pressed against the wire when a wire is inserted into the shell through the jack, so that the wire is clamped between the spring piece and the terminal, and the wire and the terminal are connected to each other.

However, it is a long-standing issue that an insufficient elastic pressing force of the spring piece for clamping the wire will lead to a poor contact or even a loosening between the wire and the terminal.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of this disclosure is to provide a terminal block having a pressing feature, which can elastically press the pressed segment of the spring piece.

To accomplish the above object, this disclosure provides a terminal block having a pressing feature, which includes a housing structure, a handle, a spring piece, and an elastic element. The housing structure includes a shell and a terminal fixed in the shell. The handle is movably disposed in the shell. The spring piece is disposed in the shell and has a first fixed segment and a pressed segment. The first fixed segment is fixed in the housing structure. The pressed segment is capable of elastically swinging relative to the first fixed segment along a swing path. The elastic element is disposed in the shell and has a second fixed segment and a pressing segment. The second fixed segment is fixed in the housing structure. The pressing segment is disposed in the swing path and capable of elastically moving relative to the second fixed segment.

In comparison with the prior art, this disclosure has the following functions: even if the clamping force from the spring piece is insufficient, a stable electric connection between the pressed segment and the wire is still guaranteed by pressing the pressed segment of the spring piece via the elastic member. This can prevent the wire to the terminal from having poor contact or even loosening.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 6:
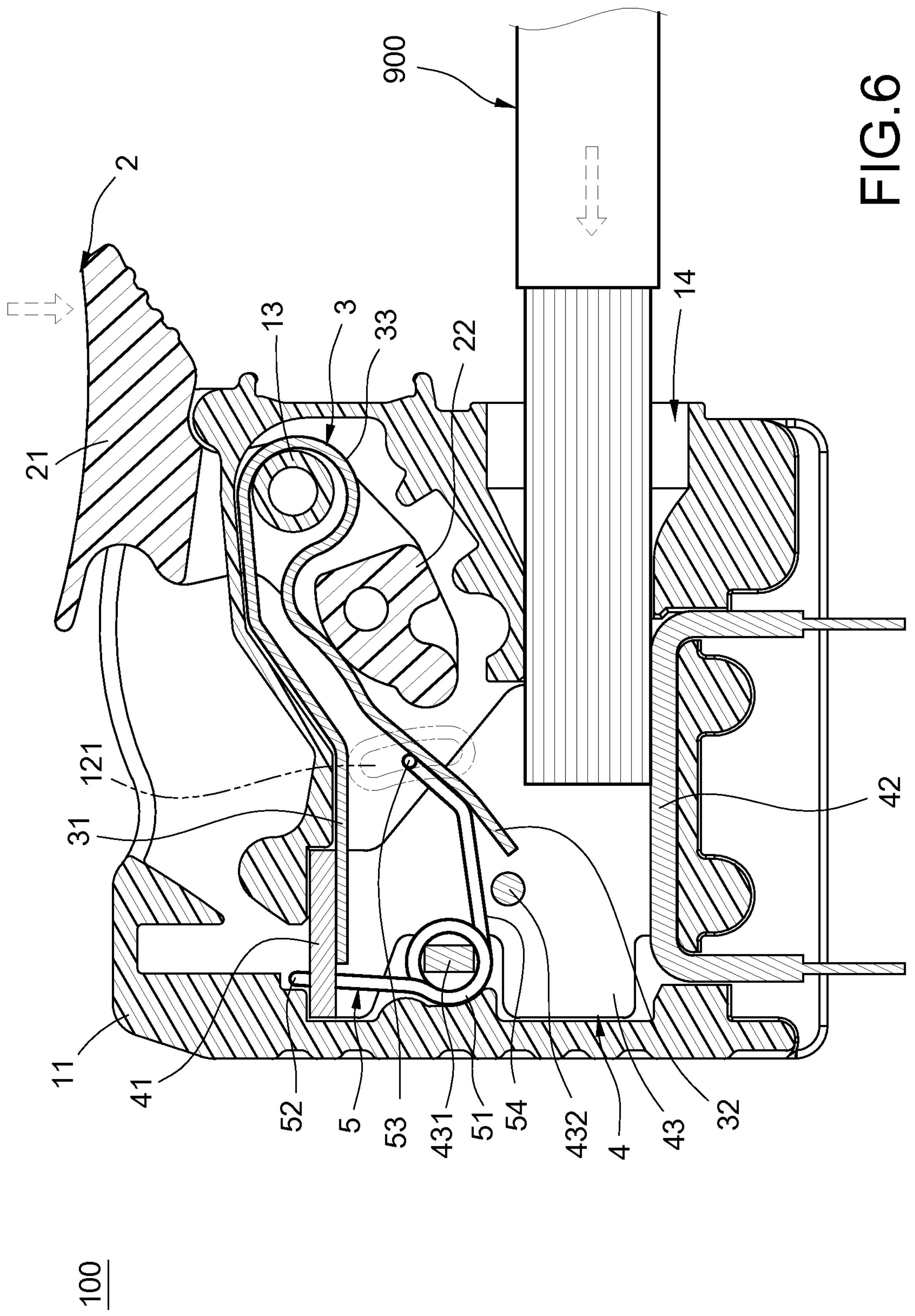
FIG. 6 is a cross-sectional view of the terminal block of this disclosure after the handle is pressed and a wire is inserted.

The disclosure provides a terminal block having a pressing feature, as shown in FIG. 6, which is used for coupling a wire 900, so as to electrically connect the terminal block having a pressing feature 100 (hereinafter "terminal block") of this disclosure with the wire 900.

As shown in FIGS. 1-5, the terminal block 100 of this disclosure includes a housing structure 1, a handle 2, a spring piece 3 and an elastic element 5.

Figure 1:
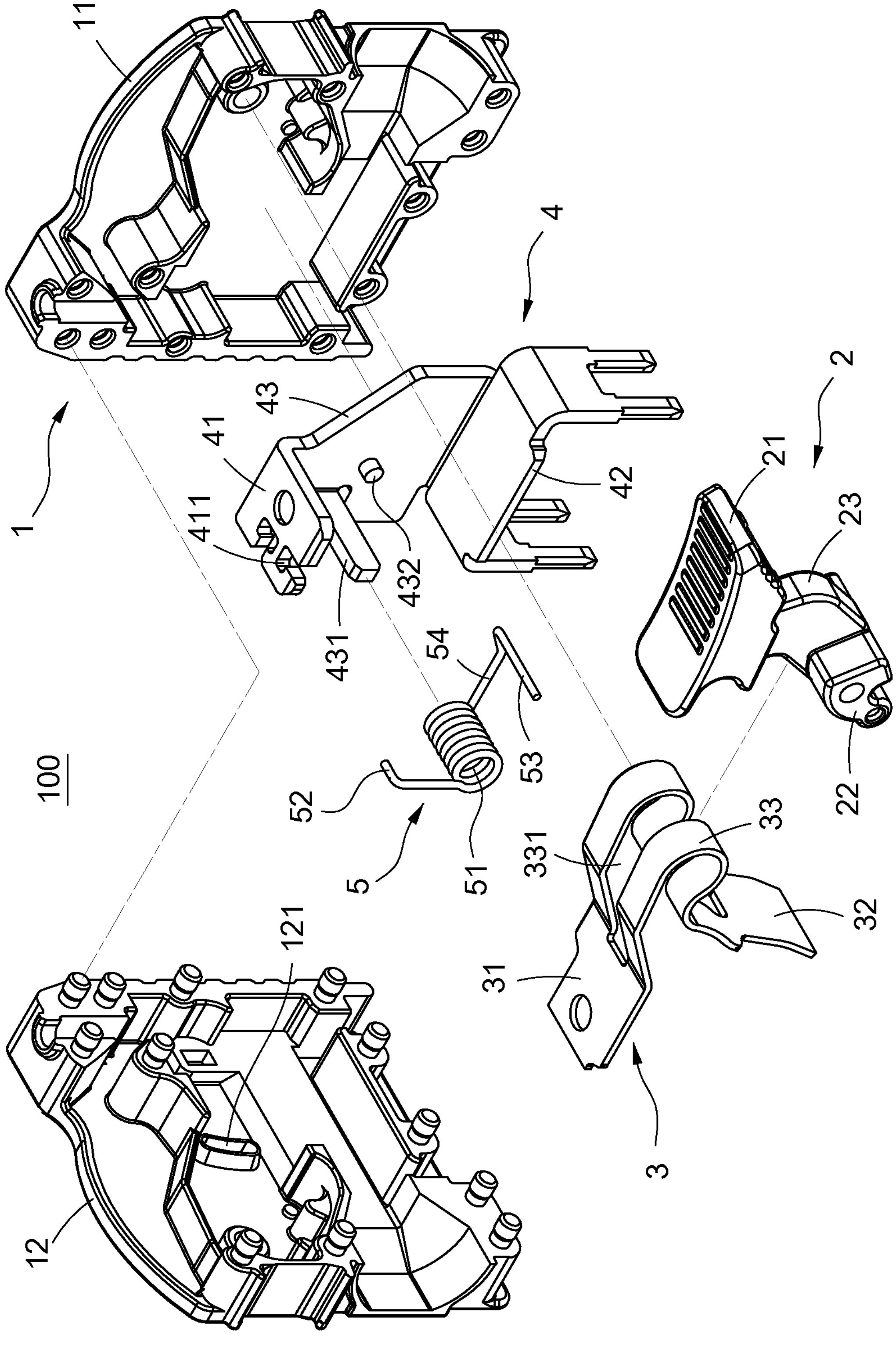
FIG. 1 is an exploded view of the terminal block of this disclosure.
Figure 2:
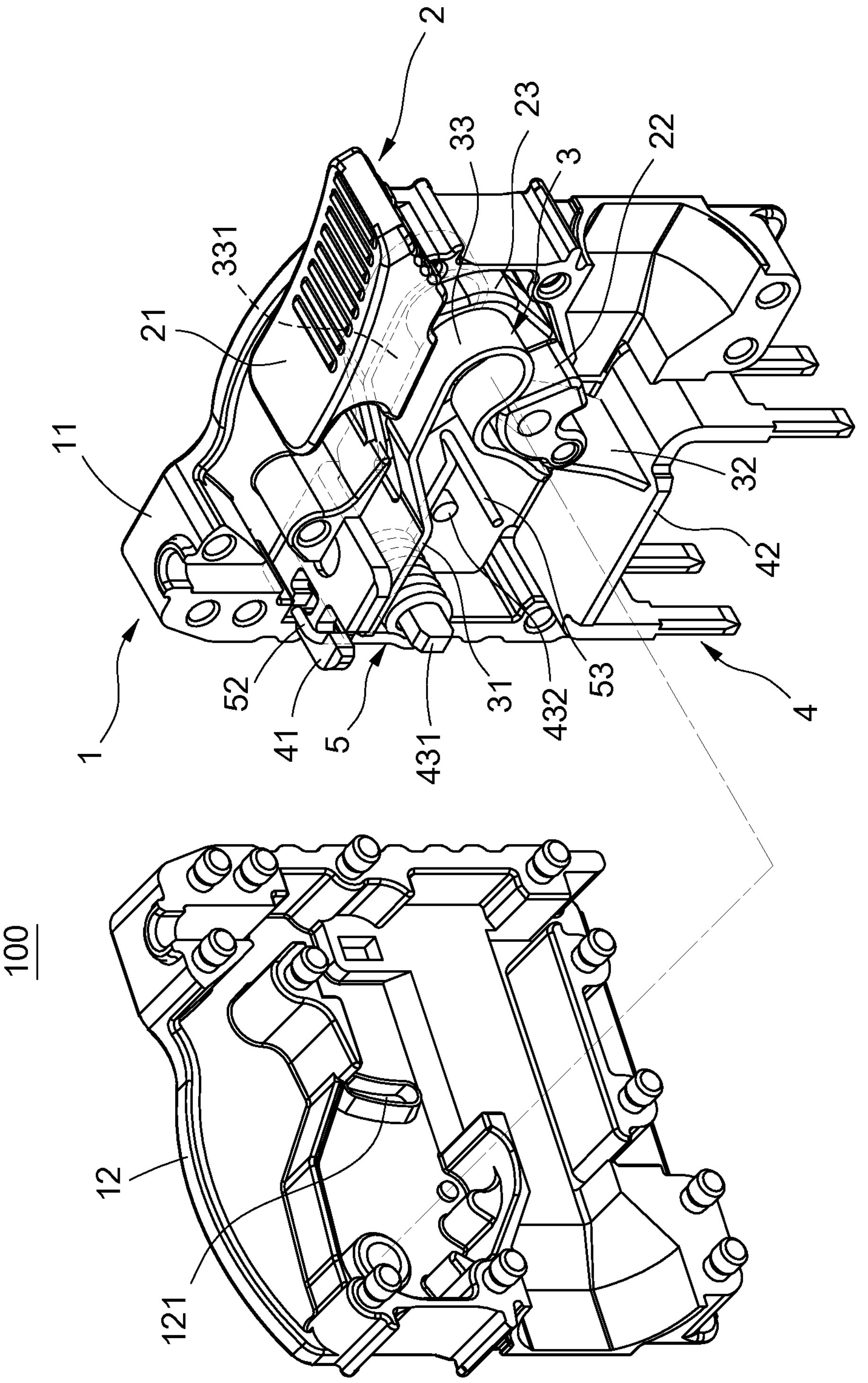
FIG. 2 is a schematic view of the terminal block of this disclosure when the housing is in an open status.
Figure 3:
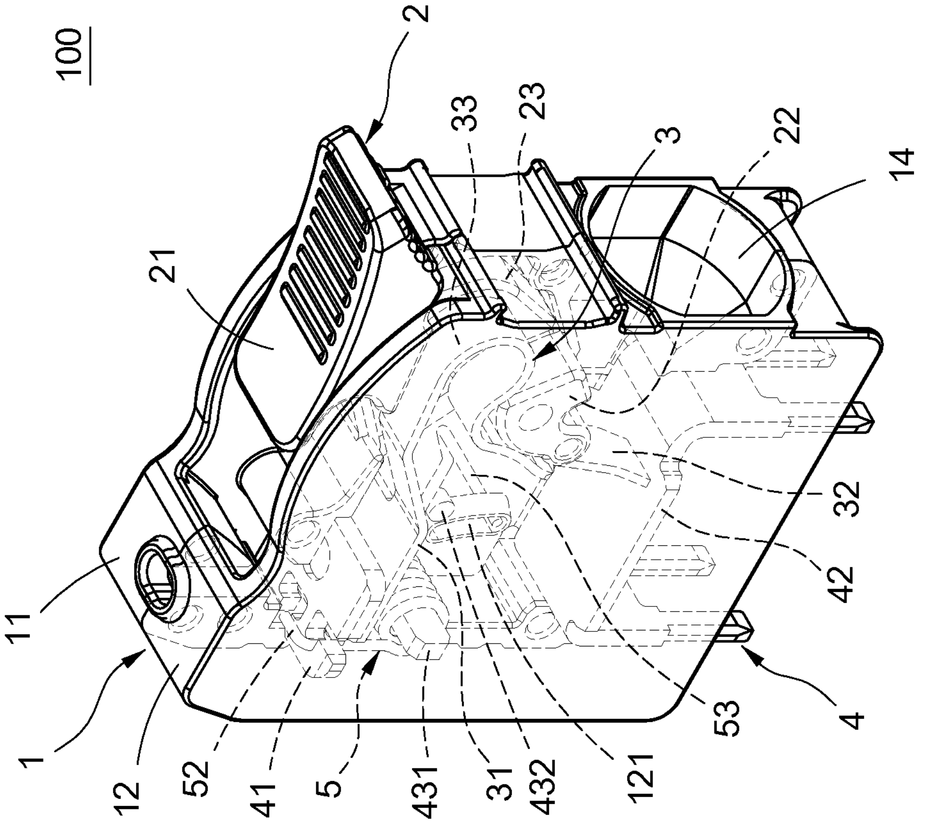
FIG. 3 is an assembled schematic view of the terminal block of this disclosure.
Figure 4:
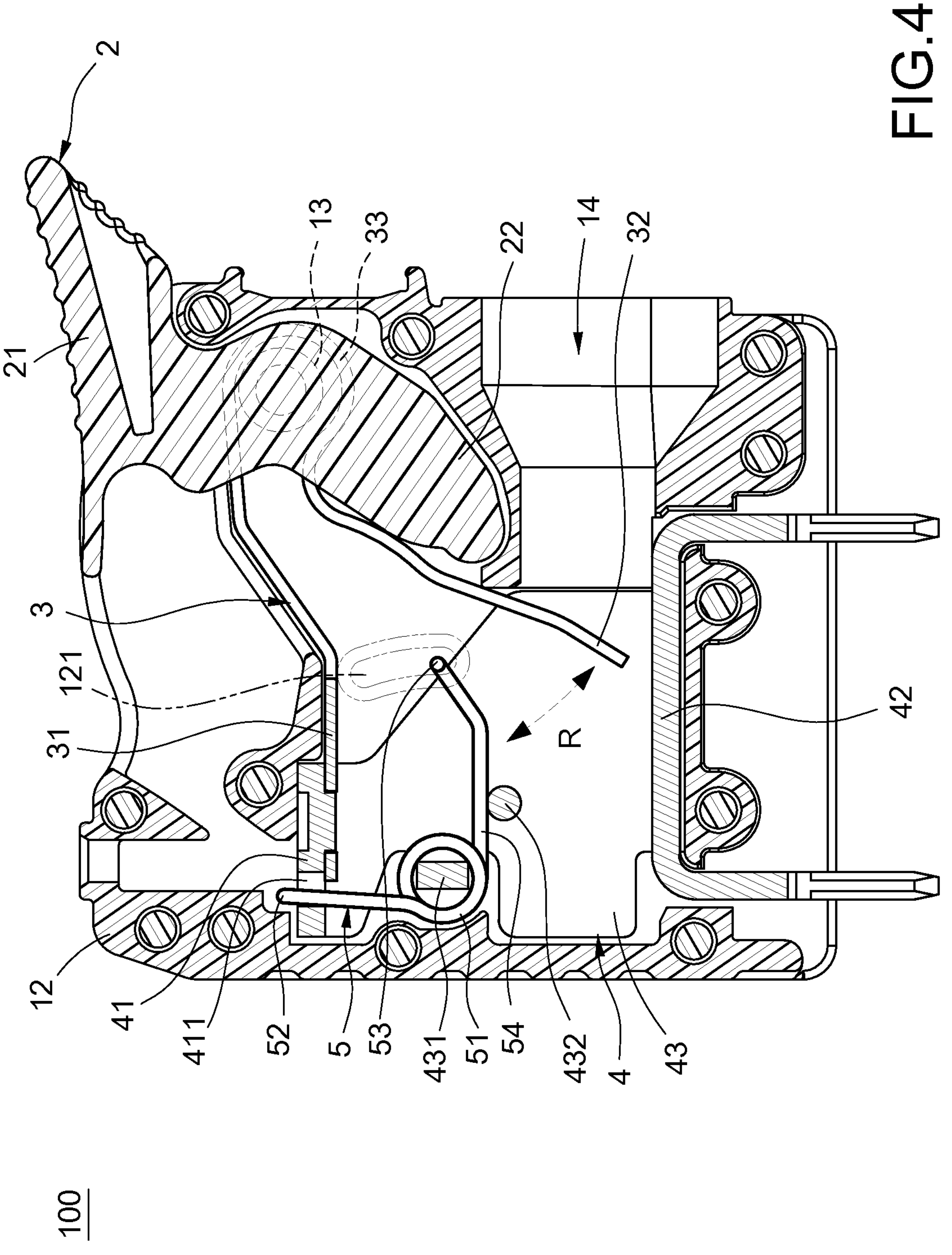
FIG. 4 is a cross-sectional view of the terminal block of this disclosure before the handle is pressed (a section on the second shell)

The housing structure 1 includes a shell (may be a two-piece structure including a first shell 11 and a second shell 12) and a terminal 4 which is fixed in the shell and partially exposed from the shell. Of course, the shell of the housing structure 1 may also be a one-piece structure (not shown in the figures). this disclosure is not limited to this. When the shell is of a two-piece structure, the first shell 11 and second shell 12 are combined with each other and jointly form a shaft 13 (as shown in FIG. 4) and a jack 14 after they both have been combined.

The terminal 4 has a platform 41, a foot portion 42 and a connecting plate 43 connected between the platform 41 and the foot portion 42. When the terminal 4 is fixed in the shell, only a portion of the foot portion 42 is exposed from the shell to allow this portion which is exposed to be soldered with a circuit board (not shown in the figures). In detail, the platform 41 is disposed with a fixing portion 411. The fixing portion 411 may be an engaging notch as shown in the figures, but this disclosure is not limited to this, any others which can fix a part of the elastic element 5 are available. The connecting plate 43 has a disposing portion 431. The disposing portion 431 may be a column as shown in the figures, but this disclosure is not limited to this, any others allowing the elastic element 5 to be disposed thereon are available.

The handle 2 is movably disposed in the shell and partially exposed from the shell to be able to move like a seesaw with a place of the shell as a fulcrum. In detail, the handle 2 has a pushed portion 21, a driving portion 22 and a neck portion 23. The neck portion 23 is connected between the pushed portion 21 and the driving portion 22. The neck portion 23 has a thickness less than that of the pushed portion 21 or the driving portion 22. When a user presses the pushed portion 21, the handle 2 may perform a motion mentioned above as a seesaw so that the driving portion 22 may be upward shifted while the pushed portion 21 is pressed down.

The spring piece 3 disposed in the shell has a first fixed segment 31, a pressed segment 32 and a connecting portion 33. The connecting portion 33 is connected between the first fixed segment 31 and the pressed segment 32. The connecting portion 33 of a curved shape (such as a U-shaped curve) is disposed to correspondingly surround the shaft 13. The first fixed segment 31 is fixed in the housing structure 1.

In detail, the first fixed segment 31 may be fixed in the shell of the housing structure 1 or fixed to the terminal 4 in the housing structure 1. In the embodiment, as an example, the first fixed segment 31 is fixed on the platform 41 of the terminal 4. When the first fixed segment 31 is fixed, the pressed segment 32 is capable of elastically swinging relative to the first fixed segment 31 along a swing path R.

In detail, a part of the pressed segment 32 is disposed corresponding to (including abutment at intervals and immediate abutment) the driving portion 22, and another part of the pressed segment 32 is disposed corresponding to the jack 14 for blocking.

In addition, a dodge opening 331 in which the neck portion 23 of the handle 2 is located may be defined on the connecting portion 33, so as to allow the driving portion 22 to abut against the pressed segment 32.

The elastic element 5 disposed in the shell and has a second fixed segment 52 and a pressing segment 53. The second fixed segment 52 is fixed in the housing structure 1. The pressing segment 53 is disposed in the swing path R and capable of elastically swinging relative to the second fixed segment 52.

In detail, the second fixed segment 52 may be fixed to the shell of the housing structure 1 or the terminal 4 in the housing structure 1. In the embodiment, as an example, the second fixed segment 52 is fixed on the fixing portion 411, so that the pressing segment 53 is allowed to perform an elastically movement relative to the second fixed segment 52 (including an elastic stretch or compression, and an elastic swing).

The elastic member 5 may be a straight cylinder spring (not shown in the figures) so as to be fixed only by the second fixed segment 52, and the pressing segment 53 can be elastically stretched or compressed relative to the second fixed segment 52. The elastic member 5 may also be a torsion spring as shown in the figures, so that the elastic member 5 further includes a sleeving portion 51 connected between the second fixed segment 52 and the pressing segment 53. The sleeving portion 51 sleeves the disposing portion 431, so that the pressing segment 53 is allowed to elastically swing relative to the second fixed segment 52 about an axis defined by the sleeving portion 51 of the elastic member 5. In detail, the pressing segment 53 may be further extended and bent to form an extended segment 54. The pressing segment 53 is connected with the sleeving portion 51 through the extended segment 54, so that this bend allows the pressing segment 53 to be disposed in the swing path R.

Figure 5:
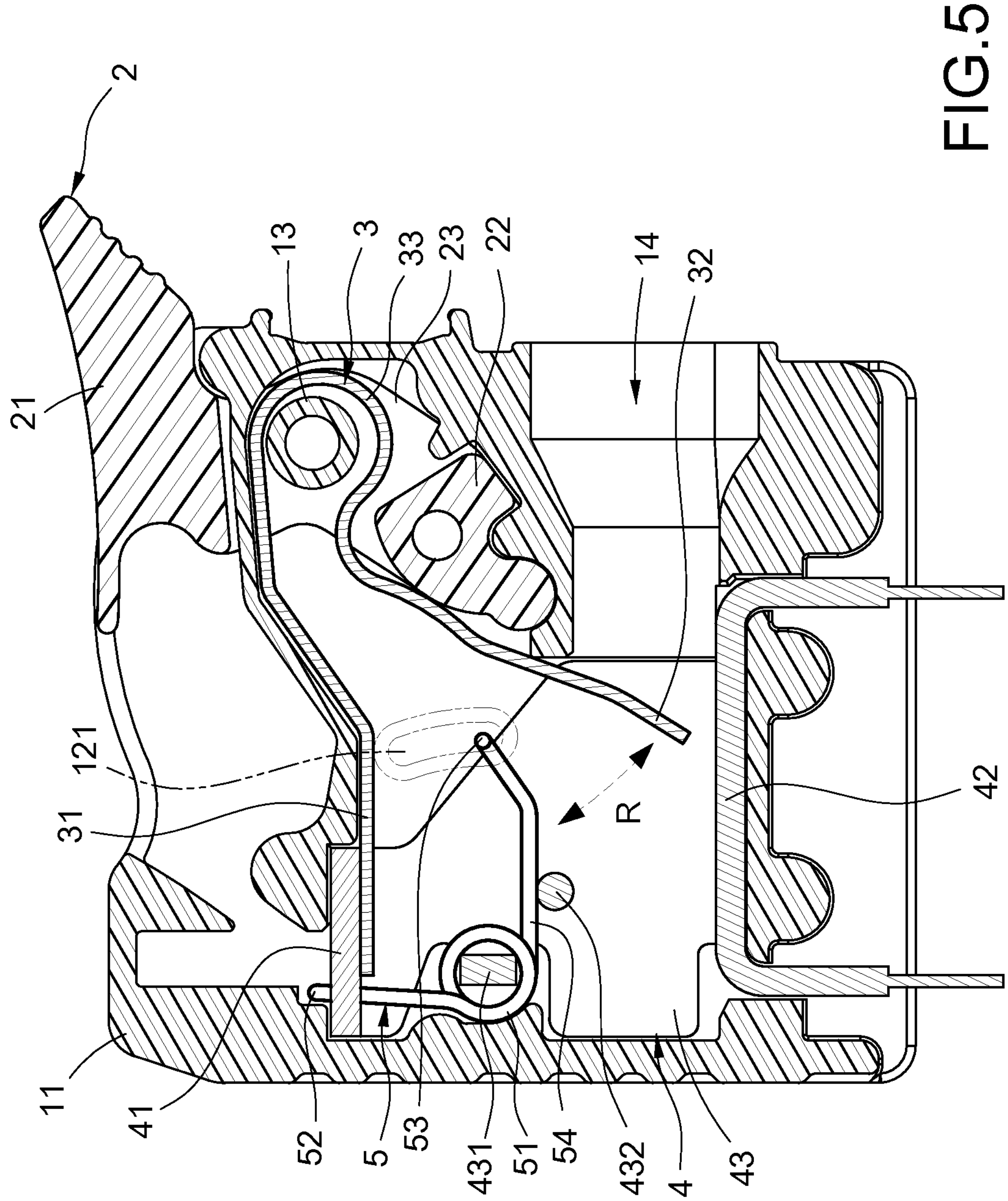
FIG. 5 is a cross-sectional view of the terminal block of this disclosure before the handle is pressed (a section on the first shell)
Figure 7:
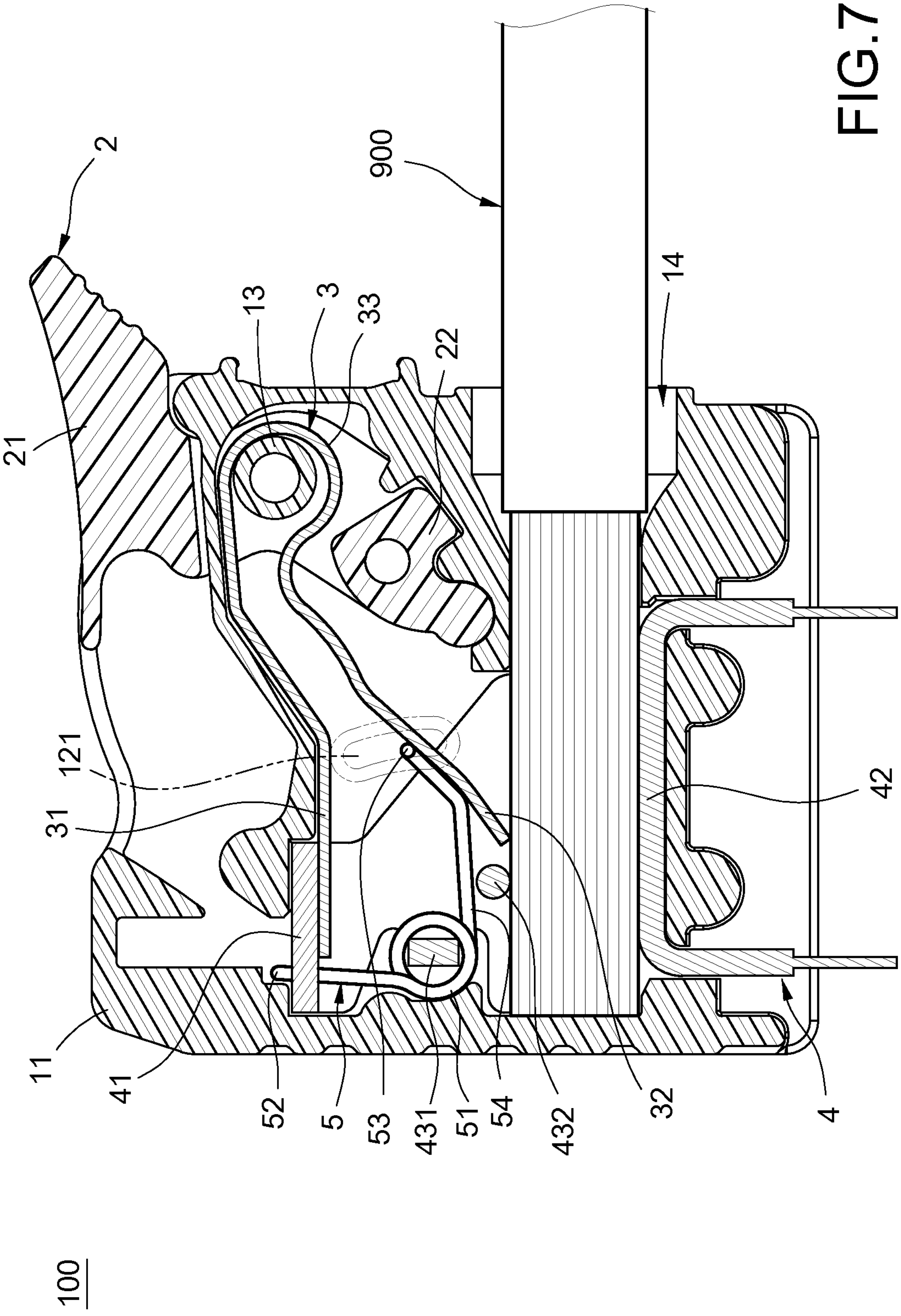
FIG. 7 is a cross-sectional view of the terminal block of this disclosure when the spring piece presses the wire.

Accordingly, as shown in FIGS. 5, 6 and 7, when inserting a wire 900 into the terminal block 100, a user presses the pushed portion 21 of the handle 2 firstly to make the driving portion 22 of the handle 2 drive the pressed segment 32 of the spring piece 3 to upward swing along the swing path R. The pressed segment 32 is upward swung to open the jack 14 and also drive the pressing segment 53 of the elastic member 5 to upward swing together, so that elastic returning forces are generated to both of the pressed segment 32 and the pressing segment 53. Then, the wire 900 is inserted into the shell through the jack 14, and the pressing force exerted on the handle 2 is released after the wire 900 has been inserted, so that the pressed segment 32 of the spring piece 3 is pressed to connect to the wire 900 by its elastic returning force. Meanwhile, the pressing segment 53 of the elastic member 5 can also press the pressed segment 32 by its elastic returning forces, thereby improving the elastic pressing and connecting force of the pressed segment 32 to the wire 900. Moreover, the wire 900 is firmly clamped between the pressed segment 32 and the foot portion 42. Also, the wire 900 and the foot portion 42 are electrically connected by their contact.

Therefore, even if the elastic pressing and connecting force from the pressed segment 32 of the spring piece 3 for clamping the wire 900 is insufficient, a stable electric connection between the pressed segment 32 and the wire 900 is still guaranteed by press the pressed segment 32 of the spring piece 3 via the elastic member 5. This can prevent the wire 900 to the terminal 4 from having poor contact or even loosening.

In addition, as shown in FIGS. 1-5, to guide the swing of the pressing segment 53 of the elastic member 5, a guiding groove 121 may be disposed on an inner side of the second shell 12. An end of the pressing segment 53 extends into the guiding groove 121 to make the pressing segment 53 able to be guided by the guiding groove 121 when swinging. To stop the pressing segment 53 of the elastic member 5, the connecting plate 43 of the terminal 4 further includes a blocker 432 abutting against the pressing segment 53 for stopping the pressing segment 53 by the blocker 432.

In sum, the terminal block having a pressing feature of this disclosure can accomplish the expected object definitely and solve the drawbacks of the prior art.

While this disclosure has been described by means of specific embodiments, numerous modifications and variations could be made thereto by those skilled in the art without departing from the scope and spirit of this disclosure set forth in the claims.

What is claimed is:

1. A terminal block for coupling a wire, comprising:

a housing structure, comprising a shell and a terminal, and the terminal being fixed in the shell;

a handle, movably disposed in the shell;

a spring piece, disposed in the shell, comprising a first fixed segment and a pressed segment, the first fixed segment being fixed in the housing structure, and the pressed segment being capable of elastically moving relative to the first fixed segment along a swing path; and an elastic element, disposed in the shell, comprising a second fixed segment and a pressing segment, the second fixed segment being fixed in the housing structure, and the pressing segment being disposed in the swing path and capable of elastically moving relative to the second fixed segment;

wherein when inserting the wire, the handle is pressed to drive the pressed segment to upward move along the swing path and out of an insertion path of the wire, and then drive the pressing segment to upward move together with the pressed segment, such that drive elastic returning forces are generated from both of the pressed segment and the pressing segment; and when the handle is released after the wire is inserted, the pressing segment and the pressed segment return back to have the pressed segment contact on the wire with the elastic returning forces pressing on the wire.

2. The terminal block of claim 1, wherein the shell comprises a jack, the handle comprises a driving portion, a part of the pressed segment is disposed corresponding to the driving portion, and another part of the pressed segment blocks the insertion path of the wire.

3. The terminal block of claim 2, wherein the handle comprises a pushed portion and a neck portion connected between the pushed portion and the driving portion, the spring piece further comprises a connecting portion connected between the first fixed segment and the pressed segment, the shell comprises a shaft, the connecting portion surrounds the shaft and is formed with a dodge opening, and the neck portion is located in the dodge opening.

4. The terminal block of claim 1, wherein both of the first fixed segment and the second fixed segment are fixed to the terminal.

5. The terminal block of claim 4, wherein the terminal comprises a platform, a foot portion and a connecting plate connected between the platform and the foot portion, and both of the first fixed segment and the second fixed segment are fixed to the platform.

6. The terminal block of claim 5, wherein the platform is disposed with a fixing portion, and the second fixed segment is fixed to the fixing portion.

7. The terminal block of claim 5, wherein the connecting plate comprises a disposing portion, the elastic member further comprise a sleeving portion connected between the second fixed segment and the pressing segment, the sleeving portion is disposed around the disposing portion, and the pressing segment is able to elastically swing relative to the second fixed segment.

8. The terminal block of claim 5, wherein the connecting plate comprises a blocker abutting against the pressing segment of the elastic member.

9. The terminal block of claim 1, wherein the shell further comprises a guiding groove, and an end of the pressing segment is extended into the guiding groove.

* * * * *